US009213867B2

(12) United States Patent
Ramamurthy et al.

(10) Patent No.: US 9,213,867 B2
(45) Date of Patent: Dec. 15, 2015

(54) SECURE CLOUD DATABASE PLATFORM WITH ENCRYPTED DATABASE QUERIES

(71) Applicant: Microsoft Technology Licensing, LLC, Redmond, WA (US)

(72) Inventors: Ravishankar Ramamurthy, Redmond, WA (US); Kenneth H. Eguro, Seattle, WA (US); Ramarathnam Venkatesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/708,396

(22) Filed: Dec. 7, 2012

(65) Prior Publication Data
US 2014/0164758 A1 Jun. 12, 2014

(51) Int. Cl.
| | |
|---|---|
| G06F 21/00 | (2013.01) |
| G06F 21/77 | (2013.01) |
| G06F 21/62 | (2013.01) |
| H04L 9/32 | (2006.01) |
| G06F 21/60 | (2013.01) |
| G06F 21/85 | (2013.01) |
| G06F 17/30 | (2006.01) |
| H04L 9/30 | (2006.01) |

(52) U.S. Cl.
CPC .............. *G06F 21/77* (2013.01); *G06F 21/606* (2013.01); *G06F 21/6218* (2013.01); *G06F 21/6227* (2013.01); *G06F 21/85* (2013.01); *H04L 9/3247* (2013.01); *G06F 17/30* (2013.01); *G06F 17/30516* (2013.01); *H04L 9/30* (2013.01)

(58) Field of Classification Search
CPC . H04L 67/1097; G06F 21/6218; G06F 21/77; G06F 17/3056; G06F 17/30
USPC ......................................................... 713/150
See application file for complete search history.

(56) References Cited

U.S. PATENT DOCUMENTS

| | | | | |
|---|---|---|---|---|
| 5,392,357 | A  * | 2/1995 | Bulfer et al. ..................... | 380/33 |
| 8,626,749 | B1 * | 1/2014 | Trepetin et al. ................ | 707/722 |
| 2003/0061205 | A1* | 3/2003 | Cleghorn et al. ................. | 707/3 |
| 2003/0074371 | A1* | 4/2003 | Park et al. ................. | 707/103 R |

(Continued)

OTHER PUBLICATIONS

Green, "Cryptography for Secure and Private Databases: Enabling Practical Data Access without Compromising Privacy," Dissertation, Johns Hopkins University, Jan. 2009, 140 pages.

(Continued)

*Primary Examiner* — Hadi Armouche
*Assistant Examiner* — Bryan Wright
(74) *Attorney, Agent, or Firm* — Sandy Swain; Micky Minhas

(57) ABSTRACT

A cloud computing service to securely process queries on a database. A security device and method of operation are also disclosed. The security device may be provisioned with a private key of a subscriber to the cloud service and may have processing hardware that uses that key, sequestering the key and encryption processing in hardware that others, including operating personnel of the cloud service, cannot readily access. Processing within the security device may decrypt queries received from the subscriber and may encrypt responses for communication over a public network. The device may perform functions on clear text, thereby limiting the amount of clear text data processed on the cloud platform, while limiting bandwidth consumed in communicating with the subscriber. Such processing may include formatting data, including arguments in a query, in a security protocol used by the cloud platform.

19 Claims, 6 Drawing Sheets

(56) References Cited

U.S. PATENT DOCUMENTS

| | | | |
|---|---|---|---|
| 2003/0120928 A1* | 6/2003 | Cato et al. | 713/176 |
| 2004/0039748 A1* | 2/2004 | Jordan et al. | 707/101 |
| 2004/0243799 A1* | 12/2004 | Hacigumus et al. | 713/150 |
| 2005/0147246 A1* | 7/2005 | Agrawal et al. | 380/44 |
| 2007/0174271 A1 | 7/2007 | Mattsson et al. | |
| 2008/0183656 A1* | 7/2008 | Perng et al. | 707/2 |
| 2011/0145593 A1* | 6/2011 | Auradkar et al. | 713/189 |
| 2011/0173231 A1* | 7/2011 | Drissi et al. | 707/771 |
| 2011/0264920 A1* | 10/2011 | Rieffel et al. | 713/189 |
| 2012/0042162 A1* | 2/2012 | Anglin et al. | 713/165 |
| 2012/0084554 A1* | 4/2012 | Van Gorp et al. | 713/150 |
| 2012/0221421 A1* | 8/2012 | Hammad | 705/16 |
| 2012/0317414 A1* | 12/2012 | Glover | 713/165 |
| 2013/0042106 A1* | 2/2013 | Persaud et al. | 713/165 |
| 2013/0111220 A1* | 5/2013 | Friedlander et al. | 713/193 |
| 2013/0191650 A1* | 7/2013 | Balakrishnan et al. | 713/190 |
| 2013/0254841 A1* | 9/2013 | Venkatesan et al. | 726/3 |

OTHER PUBLICATIONS

Liu, "An Efficient Privacy Preserving Keyword Search Scheme in Cloud Computing," 2009 International Conference on Computational Science and Engineering, 2009, 6 pages.

Popa et al., "CryptDB: Processing Queries on an Encrypted Database" Communications of the ACM, Association for Computing Machinery, Inc., vol. 55, No. 1, Sep. 1, 2012, pp. 103-111, XP058007564, ISSN: 0001-0785, DOI: 10.1145/2330667.2330691.

Written Opinion of the International Preliminary Examining Authority issued in PCT/US2013/073736, dated Dec. 2, 2014, 23 pages.

International Search Report & Written Opinion for corresponding PCT Application No. PCT/US2013/073736, mailed Jul. 21, 2014, 8 pages.

Bouganim et al., "Chip-Secured Data Access: Confidential Data on Untrusted Servers," In *Proceedings of the 28th International Conference on Very Large Data Bases*, Aug. 2002, 12 pages.

Popa et al., "CryptDB: Protecting Confidentiality with Encrypted Query Processing," *SOSP* ' 11, Cascais, Portugal, Oct. 23-26, 2011, 16 pages.

Hseuh, "Database Encryption in SQL Server 2008 Enterprise Edition," SQL Server Technical Article, Feb. 2008, 9 pages.

Eguro et al., "FPGAs for Trusted Cloud Computing," International Conference on Field-Programmable Logic and Applications, IEEE Proceedings, Aug. 2012, 8 pages.

* cited by examiner

Select sum(l_extendprice * (1.0 – l_discount))
from lineitem, orders
where l_orderkey = o_orderkey
and o_clerk = 'Venkie'
and l_commitdate < l_receiptdate

%&(GENO)@HGW{ $@T{}HGW{
W$)}()@)Y)EGWWEBN}_$(
WG{}TM$HG}@H$
G@$}GH@MFHG)$
@*{% GH}_(590%ASLIRWRR!FI{QW

Select sum(l_extendprice * (1.0 – l_discount))
from lineitem, orders
where l_orderkey = o_orderkey
and o_clerk = ')*&PQW'
and l_commitdate < l_receiptdate

Select sum(l_extendprice * (1.0 – l_discount))
from lineitem, orders
where l_commitdate < l_receiptdate

550

Select lineitem.
from lineitem, orders
where l_orderkey = o_orderkey
and o_clerk = ')*&PQW'

SECURE CLOUD DATABASE PLATFORM WITH ENCRYPTED DATABASE QUERIES

BACKGROUND

In many computing applications it is desirable to keep data secure. For example, in a medical setting, regulations require that security measures be used to prevent patient data from being accessed by unauthorized parties. If financial data, such as credit card numbers or social security numbers for customers of a business, were obtained by malicious parties, large financial losses could occur.

To protect data, enterprises may maintain their own computer systems using various security techniques to prevent unauthorized access to data. The enterprise can use physical and electronic techniques to control access to secure data. An alternative approach to protect data, even when access to the data cannot be precluded in all cases, is to encrypt the data when stored in the computer system.

Data that has been encrypted—or otherwise processed such that, even if an unauthorized party accesses the data, that party cannot determine the meaning of the data—is sometimes called "cyphertext." In a corporate network, confidential data may be stored as cyphertext, except when actually being processed. By controlling the security information, such as encryption keys, that can convert cyphertext to "cleartext," security of the data can be maintained by limiting existence of data in cleartext except in highly restrictive settings that are secure.

More recently, data is being stored or processed in "the cloud." Cloud service providers—rather than the enterprises that have data to process—provide computing resources, including processing and database storage. Cloud service providers make computing resources available to the customers, each of which makes a service level agreement (SLA) with the cloud service provider to have access to a certain level of computing resources. The enterprises access these resources by submitting jobs over the Internet for processing on the computer resources "rented" from the cloud service provider.

Traditional techniques for maintaining data security in the cloud environment do not apply. Though data may be transmitted over the Internet as cyphertext, once it is received by the cloud service provider, it is, for many operations, converted to cleartext. As a result, employees of the cloud service provider, who are inherently outside the enterprise, have access to the cleartext data and possibly to the security information for converting the cyphertext to cleartext.

SUMMARY

Secure database operations may be provided in a cloud computing environment by providing a hardware component that performs security functions on data based on security information unique to a subscriber. As a result, the physical locations at which clear text data is accessible can be limited. The data may be available only internal to a database node of the cloud environment or, in some embodiments, may be only available within the security device. In some embodiments, the security device has a form factor that is adapted for insertion into a standard slot in a database server such that communication of clear text data is limited to internal server busses.

Such a security device may receive database commands that are encrypted over the Internet or other public network. The security device may decrypt the commands and provide them to a database server for processing. When the operation is a query, the results of the query may be returned to the security device where they are encrypted for transmission over the public network.

In other embodiments, the database server may receive commands that are in an encrypted format different than that used for communication over the public network. In such an embodiment, the security device may translate queries from the encrypted format used for communication over the public network to that used by the database server. Results generated by the database server may be translated in reverse. In some embodiments, translating in reverse may include performing portions of the processing of a command. That portion of the processing may include an aggregation operation or any other suitable type of operation.

In some embodiments, translating the command may include splitting the command into sub-commands. Different sub-commands may have different encryption formats. A sub-command may be formatted for application to a plaintext database while another sub-portion may be formatter for application to an encrypted database.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 5A . . . 5D are a schematic illustrations of database commands that are processed by a security device as described herein.

DETAILED DESCRIPTION

Figure 1:
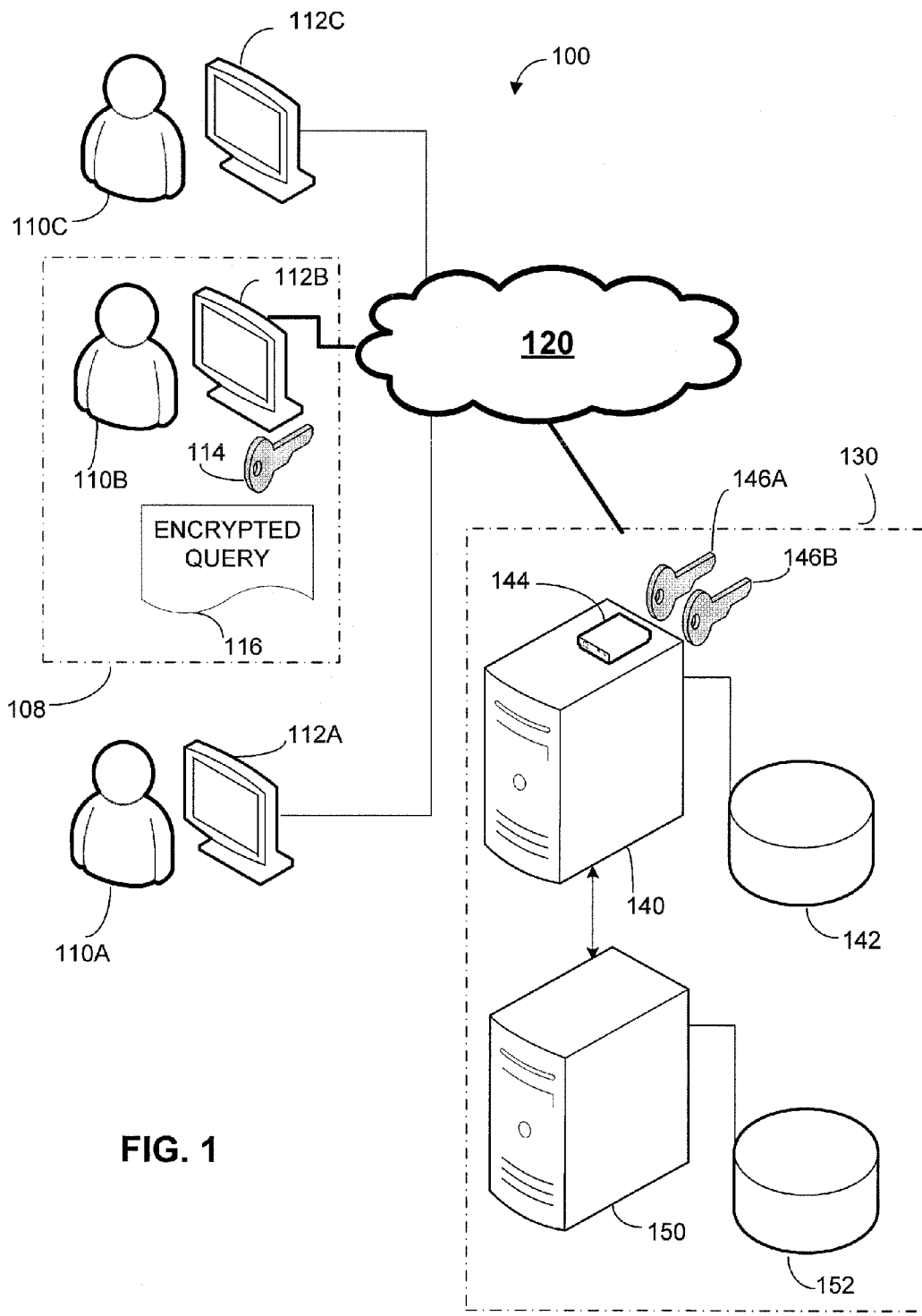
FIG. 1 is a sketch of an exemplary embodiment of a cloud computing platform utilizing a secure computing device.

The inventors have recognized and appreciated that the utility of a cloud database platform may be extended by equipping the cloud database platform with a security device. The security device may serve as an interface between a network, over which a subscriber accesses the cloud database platform, and one or more computing devices that provide data storage and retrieval resources within the cloud database platform for that subscriber.

The security device may be provisioned with cryptographic information unique to a subscriber, such as a private key. This provisioning may be performed, at least in part, by the subscriber or some trusted third party. As a result, even the operator of the cloud database platform may not have access to the cryptographic information. This cryptographic information may be used to decrypt queries submitted by the subscriber and/or to encrypt data to return to the subscriber in response to a query.

The security device may be configured to act as an interface between an unsecured network over which queries and responses will be exchanged with a subscriber. The security device may interface with computing devices within the cloud database platform on which a query may be executed.

Security may be maintained, despite the fact that the secure computing device is in the possession of and/or under the control of an operator of the cloud database platform. One or more techniques may be used to maintain security. In some embodiments, security may be maintained by locating the security device within a secured area in close proximity to a processor that executes queries within the cloud database platform. Though clear text versions of the query and data generated in response to the query may be exchanged between the security device and the processor, having those devices in close proximity in a secured area may make it difficult to access that information. In some embodiments, the security device may be installed in the same physical enclosure that houses the processor, and may be coupled to the processor over an internal bus, such as a PCI bus, of the computing device. The difficulties presented to an unauthorized individual to access information internal to a computing device within a cloud database platform further enhance security.

In some embodiments, the cloud database platform may store data in an encrypted format. Thus, even if an unauthorized individual gains access to information passing between the security device and the processor that processes a query, the information may be encrypted. This information may be encrypted in a different form than that used to transmit information over an unsecured network. Nonetheless, even if an unauthorized individual gains access to the information in this form, security need not be compromised.

In such an embodiment, the security device may receive an encrypted query over a public network. The security device may decrypt the information and translate it into a second form for application to a computing device within the cloud database platform that is configured to execute the query on an encrypted database. The results of such a query may be returned to the security device for processing and transmission to the subscriber over a public network.

In some embodiments, processing within the security device may entail decrypting the encrypted results. Alternatively or additionally, processing within security device may include operations on the decrypted results. As a result, processed query results may be returned to a subscriber, reducing the amount of information communicated over the public network and/or an amount of processing required on a client computing device used by the subscriber in order to have access to results of the query.

As a specific example of processing that may be performed within a security device, the security device may perform an aggregation function. Examples of aggregation functions include summing values and records in a database matching the query or counting the number of records in the database match the query.

Some embodiments, a cloud database platform may store data partially as clear text and partially as encrypted data. Processing on the security device may entail splitting the query such that portions may be applied to a processor that will access clear text data while other portions are applied to a process that will access the protected data. Processing of results with the security device may entail combining the results generated from the clear text data with those generated from the encrypted pages. Such processing may involve decrypting the encrypted pages such that they may be combined with the clear text pages.

Such a cloud database platform may be used to store and access any suitable types of data. For example, a secure cloud database platform may be used to enable processing of sensitive medical information about individuals. In this example, medical information, whether as part of a query or as part of a result turned in response to execute the query, may be transmitted as cypher text. Even if this transmission occurs over a public network, security of the data in transit may be maintained by encryption of the data.

Upon receipt of a query at the cloud database platform, this query may be decrypted within the security device. Security of the data may be maintained using any one or more techniques described herein. It should be appreciated that processing health information is just one example of the processing that may be performed on a cloud computing platform while maintaining data security. A platform as described herein may be used for any suitable data processing. In some embodiments, the security device may be configurable for performing operations as specified by a subscriber to whom the security device has been allocated and those operations may generate data for further processing in the cloud or for encryption and transmission to the subscriber.

In some embodiments, the security device may be implemented with physical security measures that prevent access to cleartext data being processed inside the device as part of normal operation of the secure computing device. Physical construction of the security device may thwart, or at least significantly hamper, malicious activity intended to gain access to cleartext data by restricting access to cleartext data and/or security information used for secure processing within the device without physical modifications to the device. If physical modification to the device is required for unauthorized access, that unauthorized access can be readily detected and corrective measures can be taken to maintain security.

Accordingly, in some embodiments, the security device may have an architecture such that cleartext data is only available inside a semiconductor device inside the security device. Known techniques may be employed in constructing these semiconductor devices to ensure that cleartext data cannot be detected using electromagnetic, thermal and/or other non-destructive sensing technology. For example, a metal shield plate in the packaging of the semiconductor device and/or an architecture that ensures conductors carrying cleartext data are embedded within the device may be employed to ensure that signals on those conductors cannot be readily detected from outside the semiconductor device. Known techniques alternatively or additionally may be employed to hamper altering operation of the security device that could lead to the security device revealing secret information that it uses for secure processing of sensitive data. As another example, any wires on which cleartext data may appear outside of the semiconductor device package may be encased in epoxy or other material that would have to be physically altered to gain access to the cleartext data.

A suitable semiconductor device for implementing a security device may be a programmable logic device, such as a field programmable gate array (FPGA). Some known FPGA devices include features that facilitate loading of secure programming, only by authorized parties. Such features may be used here to allow a subscriber to a cloud database platform to control the programs executed by the security device, even though the security device is located on the premises of an operator of a cloud database platform. Accordingly, an FPGA may be used without modification or, in some embodiments, may incorporate features in addition to those in a conventional FPGA device to support additional functions of the secure computing device.

The security device may employ one or more techniques to preserve security. Such techniques may entail performing processing on sensitive cleartext data only within internal components of the security device such that, even an administrator of the cloud database platform does not have access to the sensitive, cleartext data.

In embodiments in which the security device is programmable, security may be maintained by verifying instructions to program the device prior to configuring the device with those instructions. Any suitable technique may be used to verify a set of instructions. In some embodiments, a set of instructions may be loaded into the security device in a format that is encrypted, cryptographically signed or otherwise processed with security information. The security device may perform cryptographic processing on the set of instructions to ensure that they were processed with security information corresponding to a trusted source.

In some embodiments, different types of information may be processed differently to maintain security. In some embodiments, the security device may use a bootstrap process to load information that is known to be secure. The bootstrap process, for example, may rely on security information, such as a key, associated with the trusted source loaded into the secure computing device prior to operation of the device.

This pre-loaded security information, associated with a trusted source, may be used by the security device to verify information provided during operation of the device. In some embodiments, the security information may be used by the security device to verify configuration information that configures the device to perform secure operations for a specific subscriber. That configuration information may include further security information associated with the specific customer that can decrypt and/or encrypt queries and/or data associated with operations performed for the specific customer. Alternatively or additionally, the configuration information may include a loader program, which can load a set of instructions provided by the customer to perform a secure operation. The loader program may be adapted to operate with the security information associated with the specific subscriber such that programming of the security device is limited to that specific customer.

Such an approach provides significant flexibility in configuring the security device, without access to any secure information by the operator of the cloud database platform. To allow the cloud platform to be used for secure processing for a specific subscriber, the operator of the cloud database platform may allocate a security device for use by the specific subscriber. Thereafter, the security device may automatically interact with a trusted authority and/or the specific subscriber to which it has been allocated.

Turning to FIG. 1, an exemplary computing environment 100 is illustrated. Environment 100 includes a cloud database platform 130. As in a conventional cloud database environment, cloud database platform 130 includes processing and data storage resources. In this example, those processing resources are illustrated by computing devices 140 and 150. The storage resources are illustrated by databases 142 and 152.

In this example, database 142 may be a clear text database. Computing device 140 may be configured with a query engine to perform clear text queries against database 142. Database 152 may be an encrypted database, some or all of the data stored in the database being stored in an encrypted form. Computing device 150 may be configured with a query engine to perform encrypted queries against database 152.

As a specific example, database 152 may store health information. Any personally identifiable information associated with health information may be stored in database 152 in an encrypted form. Thus, if database 152 contains information about a patient, whose name is John Smith, the name "John Smith" will not appear in database 152. Rather, an encrypted form of the name "John Smith" will appear. As an example, the encrypted form of the name "John Smith" might appear as "AGF$#*%." Accordingly, a query engine, seeking information on John Smith, would search for records in database 152 containing the encrypted name "AGF$#*%."

Though FIG. 1 shows only two computing devices and to databases within cloud database platform 130, it should be appreciated that a cloud database platform may have numerous computing devices and numerous databases that, in operation, are allocated to subscribers procuring database services from an operator of cloud database platform 130. Accordingly, it should be appreciated that many details of a cloud database platform 130 are omitted from FIG. 1 for simplicity.

FIG. 1 shows multiple subscribers 110A, 110B and 110C that may access cloud database platform 130 through respective client computing devices 112A, 112B and 112C. As in a conventional cloud database platform, the client computing devices are connected to cloud database platform 130 through a network 120, which may be the Internet.

Because network 120 may be a public network or other unsecure network, subscribers may use encryption for information exchanged with cloud database platform 130. In this way, clear text information may exist only within subscriber premises 108 and within facility holding the components of cloud database platform 130. Communications traveling between those facilities may be encrypted such that, even if a communication is intercepted by an unauthorized third party, that third-party may be unable to use the information contained in the communication.

To support this encryption function, a subscriber, such as subscriber 110 B, may have a key 114. When subscriber 110B inputs a query to client computing device 112B, an encryption program executing on client computing device 112B may use key 114 in a cryptographic computation to generate encrypted query 116. Encrypted query 116, rather than the clear text version of the query generated by subscriber 110B, may be communicated over network 120.

At cloud computing platform 130, a corresponding key may be applied to decrypt encrypted query 116. In this example, key 146A may be complementary to key 114 such that a computing device within cloud computing platform 130 may use key 146A to decrypt the query. This query, once decrypted, may be applied by a query engine to search a database 142 and/or 152. In embodiments in which the query is to be applied for searching encrypted database 152, some translation of the query may be required so that the query, though initially in clear text will specify values as they appear in encrypted database 152.

In some embodiments, some or all of this decryption and translation might occur within the computing devices 140 and/or 150. However, in the embodiment illustrated in FIG. 1, cloud computing platform is equipped with a security device 144. Some or all of the processing relating to encryption/decryption and translation of queries for security reasons that is performed at cloud computing platform 130, may be performed within security device 144. Security device 144 may be a computing device as described herein are owned by the operator of cloud computing platform and allocated to a subscriber. Although FIG. 1 shows only a single security device 144 which, in this example, has been allocated to subscriber 110B, a cloud computing platform supporting multiple subscribers may contain multiple security devices (which are not expressly illustrated for simplicity).

Any suitable processing may be performed within security device 144. In some embodiments, the specific processing performed may be specified by a program loaded under control of subscriber 110B. That processing may use keys which are also loaded under the control of subscriber 110B. Moreover, security device 144 may be configured and packaged in such a way that data within security device 144 may not be accessed using readily available tools. In this way, not even personnel of the operator of cloud computing platform 130 may have ready access to the programming and keys or other security information within security device 144.

In the example of FIG. 1, keys 146A and 146B are illustrated. These keys illustrate that different keys may be used for different security functions. For example, key 146A may be used to decrypt encrypted queries sent by subscriber 110B and/or to encrypt the results of executing those queries returned to subscriber 110 B. Key 146B may be used for security functions associated with access to data in encrypted database 152. For example, key 146B may be used in translating a decrypted query for application to encrypted database 152. Alternatively or additionally, key 146B may be used in decrypting encrypted results returned by querying encrypted database 152. Having a key for decryption of results from encrypted database 152 may allow secure processing within security device 144 to include operations on clear text data derived from encrypted information in encrypted database 152.

Figure 2:
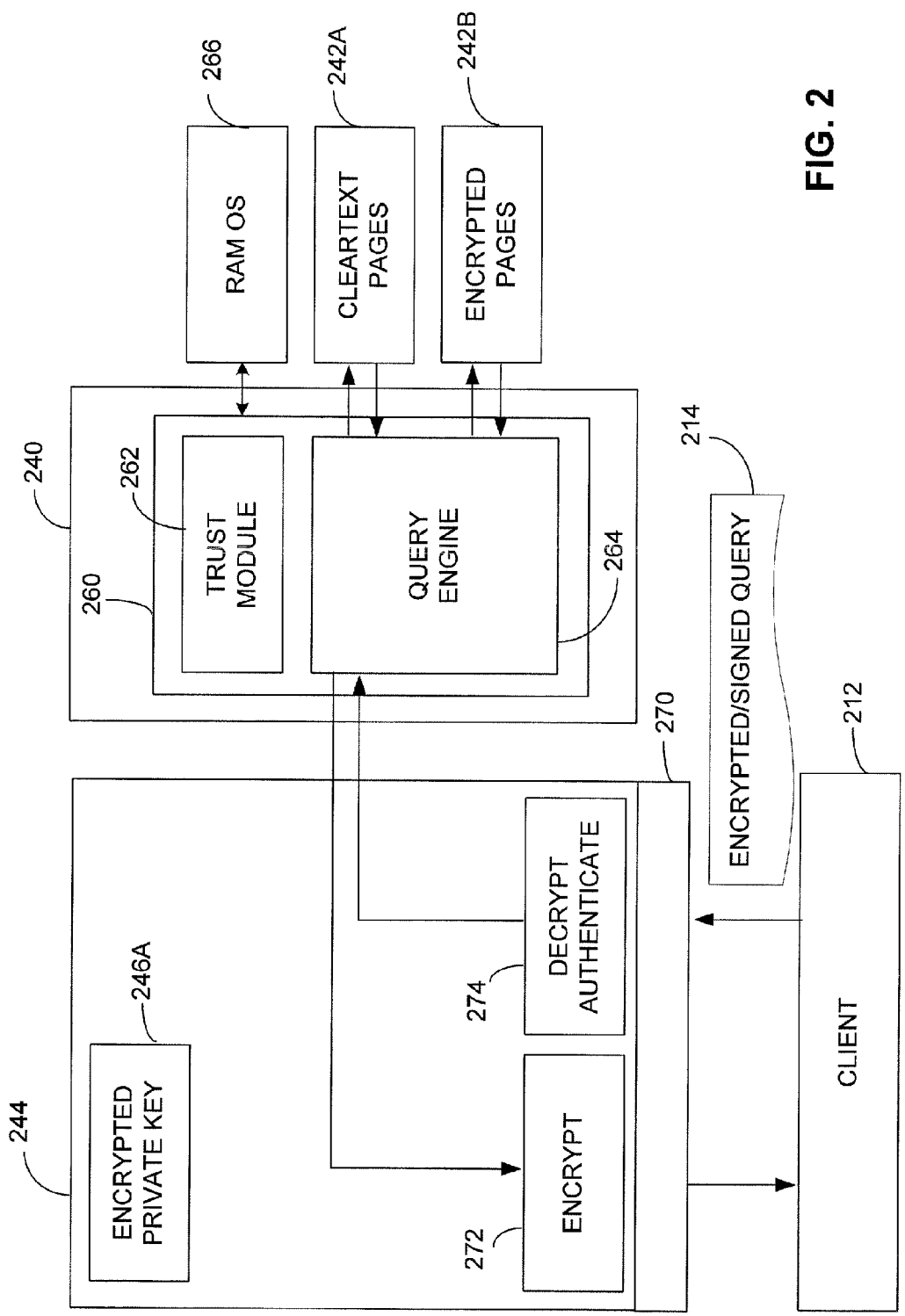
FIG. 2 is a functional block diagram of an exemplary embodiment of a cloud database node incorporating a security device.

The security processing provided by security device 144 may be used in any of a number of ways. The specific processing performed may depend on a desired level of security. FIG. 2 is an example of the embodiment providing a first level of security. FIG. 2 shows a computing device 240, such as a database server, configured with a query engine 264 executing within an operating system environment 260. Also executing with in operating system environment to 60 is trust module 262. Trust module 262 may ensure that computing device 240 boots into a known state, which, for example, may be a state that is not corrupted by a virus. Additionally, trust module 262 may allow computing device 240 to maintain information in the bulk storage in an encrypted form.

Accordingly, the example of FIG. 2 includes encrypted pages 242B. To process the query, some portion of the encrypted pages 242B may be translated by trust module 262 into clear text pages 242A. The operating system environment 260 may control which encrypted pages are translated to clear text pages 242B, and when clear text pages 242A are deleted. This processing by the operating system may access RAM 266.

In this example, query engine 264 is configured to execute a plain text query. When a query is applied to query engine 264, it may apply that query against clear text pages 242A. The results of such a query are returned in clear text form. This processing may be performed using components as are known in the art. Though, such processing within computing device 240 may be performed in any suitable way.

To provide security, even though the queries and results may be transmitted over a public network as they are exchanged with client 212, a security device may be incorporated on the premises of the cloud computing platform. In this example, that security device may be implemented as part of a network interface component 244.

The security device may include a physical network interface 270, allowing the security device to be connected directly to on network through which communications may be exchanged with client 212. In this example, a received communication may be in the form of a query 214 that is encrypted and/or signed by cryptographic processing on client 212. Likewise, results may be encrypted and/or signed before being transmitted through physical network interface 270 to client 212.

To support the cryptographic processing necessary to encrypt and/or sign as well as to decrypt and/or verify a signed communication, the security device may be configured with a key 246A. That key may be an encrypted private key or may be stored in any suitable form. Techniques as described above, or any other suitable techniques, may be used to configure the security device with key 246A in a secure way.

In the example of FIG. 2, key 246A is used in component 274 to decrypt and authenticate queries received from client 212. The resulting clear text queries may be applied to query engine 264. Clear text results returned as a result of query engine 264 executing the query may be processed in component 272. Processing in component 272 may encrypt the clear text results of executing the query for transmission through physical network interface 270 back to client 212.

In this example, components 272 and 274 may be implemented by programming an FPGA that is part of the security device. Such programming may be done in such a way that an unencrypted version of private key 246A cannot be accessed without extreme measures to crack into the internal processing of that FPGA. Though, it should be appreciated the specific techniques and hardware used to perform the cryptographic processing within the security device is not critical to the invention, and any suitable techniques and hardware may be used.

Figure 3:
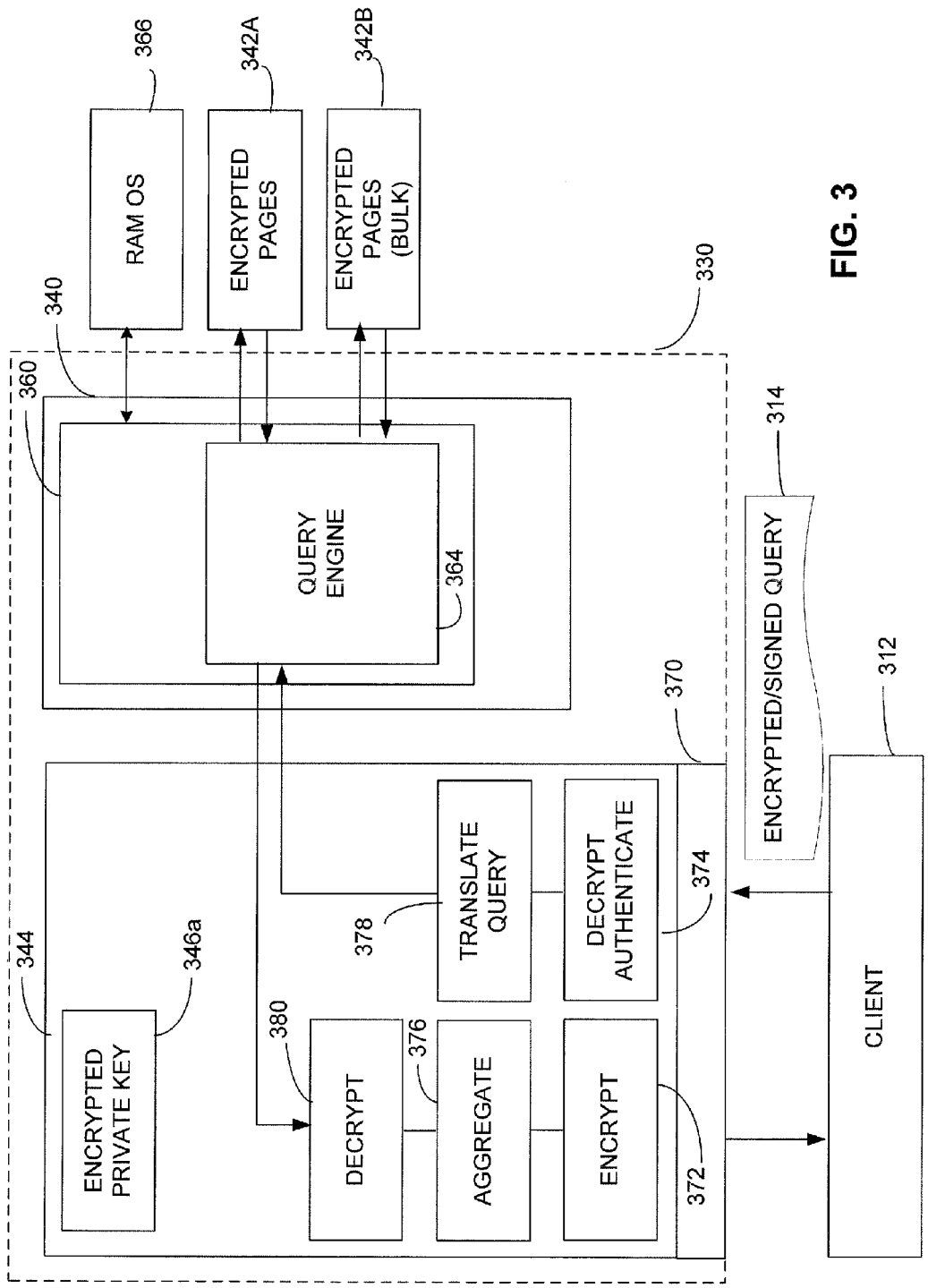
FIG. 3 is a functional block diagram of a second exemplary embodiment of a cloud database node incorporating a security device.

FIG. 3 illustrates an alternative embodiment in which additional security may be provided. FIG. 3 shows a computing device 340 configured with a query engine 364. As with the embodiment shown in FIG. 2, encrypted pages 342B may be stored in bulk form. Similarly, RAM 366 may be available for use by components of operating system environment 360.

However, in this embodiment, rather than decrypting the pages, encrypted pages 342A may be selected from bulk encrypted pages 342B and copied into faster memory. Query engine 364 may execute queries against the encrypted pages 342A. Because the pages are encrypted, query engine 364 may process a query formatted for application to encrypted pages.

Accordingly, a security device may receive a query and translate the query into a format for application by query engine 364 to encrypted pages. As with the embodiment in FIG. 2, the security device may be implemented as part of a network interface component. In the specific example of FIG. 3, that network interface component may be a network interface card connected to processing components of computing device 340 over a PCI bus for other internal bus of a computing device.

Accordingly, FIG. 3 shows that network interface component 344 is in the same enclosure 330 as the components performing processing for computing device 340. Enclosure 330, for example, may be an enclosure for a server rack. Though, it should be appreciated that any suitable enclosure may be used to enclose both the security device and processing components a computing device 340. In some embodiments, the closure may be a housing for a server. Regardless of the specific construction of the enclosure enclosing the security device, processing components and a bus interconnecting them, such an arrangement may provide physical security that reduces opportunities for unauthorized third parties to access data. Accordingly, such an enclosure may be used in any of the embodiments described herein.

In the illustrated example, a client 312 generates an encrypted/signed query 314. Query 314 may be transmitted over a public network such as the Internet. That query may be received at physical interface 370, which may be part of a network interface card 344. Also implemented on network interface card 344 may be components for performing security functions. Additionally, on the encrypted private key 346A may be stored on network interface card 344. As in the embodiment illustrated in FIG. 2, the encrypted key may be stored in such a way that it is not used outside of components that perform a secure processing within the security device.

In the illustrated embodiment, those components may include a component 374 that decrypts and authenticates query 314. The decrypted query, which may be in plain text, may be provided to component 378 that translates the query.

Translation within component 378 may entail formatting the query for application to query engine 364. In this example, query engine 364 applies queries to an encrypted database. Accordingly, translation within component 378 may entail formatting terms in the query such that they will match corresponding terms in the encrypted pages 342A. Such processing may be performed using a key, such as key 146B (FIG. 1), or any other suitable key for processing technique. In this way, sensitive data contained within the query may be available only within the security device.

Processing performed within translation component 378, and other components within the security device, may be specified by a subscriber based on the form of encryption used for data stored in encrypted pages 342A. For example, component 378 may be programmed to identify values corresponding to fields in a database for which encryption is used. This information may be known a priori at the time of programming or component 378 may be programmed to recognize dynamically fields for which encryption is used.

A similar approach may be used for results returned from the query. Query engine 364 may, in response to a query, return data derived from encrypted pages 342A. Such data may contain sensitive values only in encrypted form. This data may likewise be decrypted to translate it out of the format used for encrypted pages 342A.

To reduce the amount of data transmitted to client 312, the security device may perform an aggregation function on the data. The aggregation function may in some way aggregate values returned from multiple pieces of data matching the specified query. As a specific example, the aggregation function may sum values from multiple records matching a query. As a specific example, the encrypted pages 342A may contain information on purchases made. An applied query may request information on all purchases made by a specific individual. Aggregation may entail summing the amounts of these purchases.

In the embodiment illustrated, however, the aggregation function would not return an appropriate result were it performed on encrypted values taken directly from encrypted pages 342A. Accordingly, query results passed from query engine 364 to decryption component 380 within the security device. Decryption component 380 may decrypt any encrypted values in the query result. Processing in decryption component 380 may use the same key or other security information as is used in translation component 378. Though, any suitable processing may be used to decrypt values in the encrypted result.

The decrypted results may be passed to aggregation component 376. Aggregation component 376 may be programmed to perform any desired aggregation function. The specific function may depend on the specific use of the data and the nature of queries to be issued from client 312. As with other components within the security device, the programming of aggregation component 376 may be specified by the subscriber to which the security device has been assigned.

Regardless of the specific aggregation function performed within component 376, the results of that function may be passed to component 372. At component 372, the resulting data may be encrypted. The encrypted data may then be passed through physical network interface 370 for transmission over the Internet back to client 312.

In this embodiment, it should be recognized that different encryption formats are used for communications over the Internet and for storage of encrypted data within the cloud database platform. Such an architecture allows for strong encryption of information transmitted over the public network and faster processing for data maintained within a private cloud database environment. However, it should be appreciated that any suitable encryption techniques, regardless of strength may be used for either or both of these functions.

Figure 4:
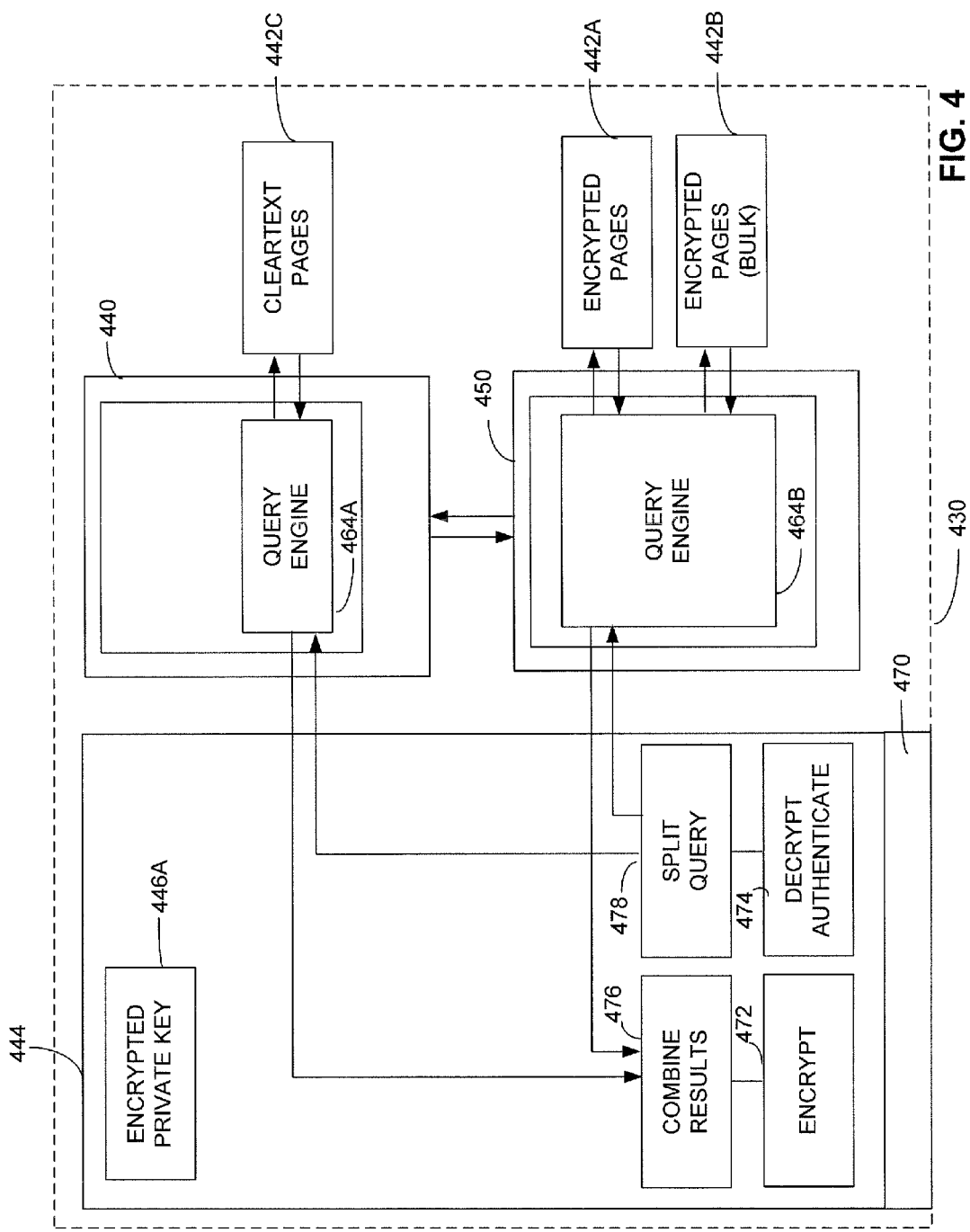
FIG. 4 is a functional block diagram of a third exemplary embodiment of a cloud database node incorporating a security device.

Turning to FIG. 4, an additional embodiment is shown that provides greater flexibility in the types of processing operations that may be performed on results retrieved in response to a query. In this embodiment, as with the embodiments in FIGS. 2 and 3, a security device is implemented as part of a network interface 444. Network interface 444 has a physical network interface 270 that may connect to a public network, such as the Internet. Though not shown in FIG. 4, one or more client devices may send queries received through physical network interface 470.

The received queries may be encrypted for security. Accordingly, the security device of FIG. 4 includes a decryption/authentication component 474, which may perform functions similar to components 374 or 274, as described above. Likewise, the security device of FIG. 4 may include in encryption component 472, which may perform functions similar to encryption components 272 and 372, as described above. To support these functions, the security device may be configured with an corrupted private key 446A, which may also be similar to the private keys described in connection with FIG. 2 and FIG. 3 above.

Also as described above in connection with FIG. 3, data may be stored in encrypted bulk pages 442B. Some portion of these pages may be selected and copied to encrypted pages 442A, which may be stored temporarily in the faster memory for faster application of queries to those pages by query engine 464B.

Also as described above in connection with FIG. 2, some of the pages from encrypted bulk pages 442B may be selected, decrypted and temporarily stored as clear text pages 442C. Clear text queries may be applied to clear text pages 442C.

Accordingly, FIG. 4 illustrates an embodiment in which both encrypted and clear text queries may be processed in the same database node. In this example, to support processing of both encrypted and clear text queries, two computing devices, each with a query engine is illustrated. Computing device 440 is shown to contain query engine 464A. In this example, query engine 464A executes clear text queries against clear text pages 442C. Computing device 450 is shown containing query engine 464B. Query engine 464B executes encrypted queries against encrypted pages 442A.

It should be appreciated that two computing devices with two query engines are shown for simplicity. More computing devices and/or more query engines may be used in some embodiments. Alternatively, in some embodiments one query engine may be configured to execute both clear text and encrypted queries. Alternatively, multiple query engines may execute on one computing device.

Regardless of the manner in which the database node is architected to support execution of clear text and encrypted queries, the security device may be configured to generate those queries based on queries received from a client. In the example illustrated in FIG. 4, the security device includes a query splitting component 478. Once a query is received and decrypted and authenticated, component 474A pass that query to query splitting component 478.

Query splitting component 4788 process the query to generate a clear text query and unencrypted query. The clear text query may be provided to query engine 4648. The encrypted query may be provided to query engine 464B.

The security device may also contain a component to combine the results of processing the portions of the split query. For this purpose, the security device may include a combining component 476. Combining component 476 receives clear text results from query engine 464A. Encrypted results are received from query engine 464B.

Any suitable processing may be performed to combine the query results. In the embodiment illustrated, the encrypted results from query engine 464B may, within combining component 476, be translated to a clear text format. As a result, within the security device all of the results may exist in clear text format and may be readily combined.

Once combined, the results may be provided to encryption component 4724 transmission to a client that generated the query.

FIGS. 5A, 5B, 5C and 5D illustrate various query formats. FIG. 5A illustrates a clear text query 510. Query 510 includes an aggregation function, here shown as a sum function: sum (1_extendprice*(1.0−1_discount). This function indicates fields within database records that are to be numerically combined and provides a formula for that combination. Other portions of the query specify which records are to be selected from the database for processing in the sum function.

In this example, the query is clear text such that any sensitive information is discernible in the query. For example, value 512 may be a name. The entity maintaining a database to which this query may be applied may not want to reveal that it is storing information about a named individual. For this reason, query 510 may be communicated over a public network in encrypted form.

FIG. 5B illustrates a fully encrypted query 520. In fully encrypted query 520, neither the function of the query nor specific names or other values are identifiable. However, in this format, it would be difficult or impossible match criteria specified in the query to data stored in a data base.

FIG. 5C illustrates an encrypted query that may be readily applied to a database. In query 530, the values representing sensitive information may be encrypted. However, other portions of the query are retained as clear text. Accordingly, by comparing FIG. 5C to FIG. 5A, it can be seen that clear text value 512 has been replaced by encrypted value 532. Though, both values can be seen in the context of the queries to be of value for the field "o_clerk" in a database. If the corresponding all values of the field "o_clerk" in a database are also encrypted with the same corruption scheme, the encrypted value 532 will still match appropriate records in the database. In this way, the query can be applied in encrypted form to the database.

FIG. 5D illustrates an example of query splitting. A query 540 has been split into portions 550 and the 560. Portion 550 is a clear text query, specifying information to retrieve from a clear text database. In contrast, portion 560 contains an encrypted value 562, specifying criteria for retrieving information from an encrypted database.

In a system as illustrated in FIG. 4, the received query may be split into portions, such as portions 550 and 560. These portions may be applied to query engines 464A and 464B, respectively. In a system as illustrated in FIG. 3, a translated query in the form of query 530 may be applied to query engine 364. In a system as illustrated in FIG. 2, a clear text query, as illustrated in FIG. 5A may be applied to query engine 264. In this way, queries of different forms may be applied to systems with different architectures to provide a desired level of security.

Figure 6:
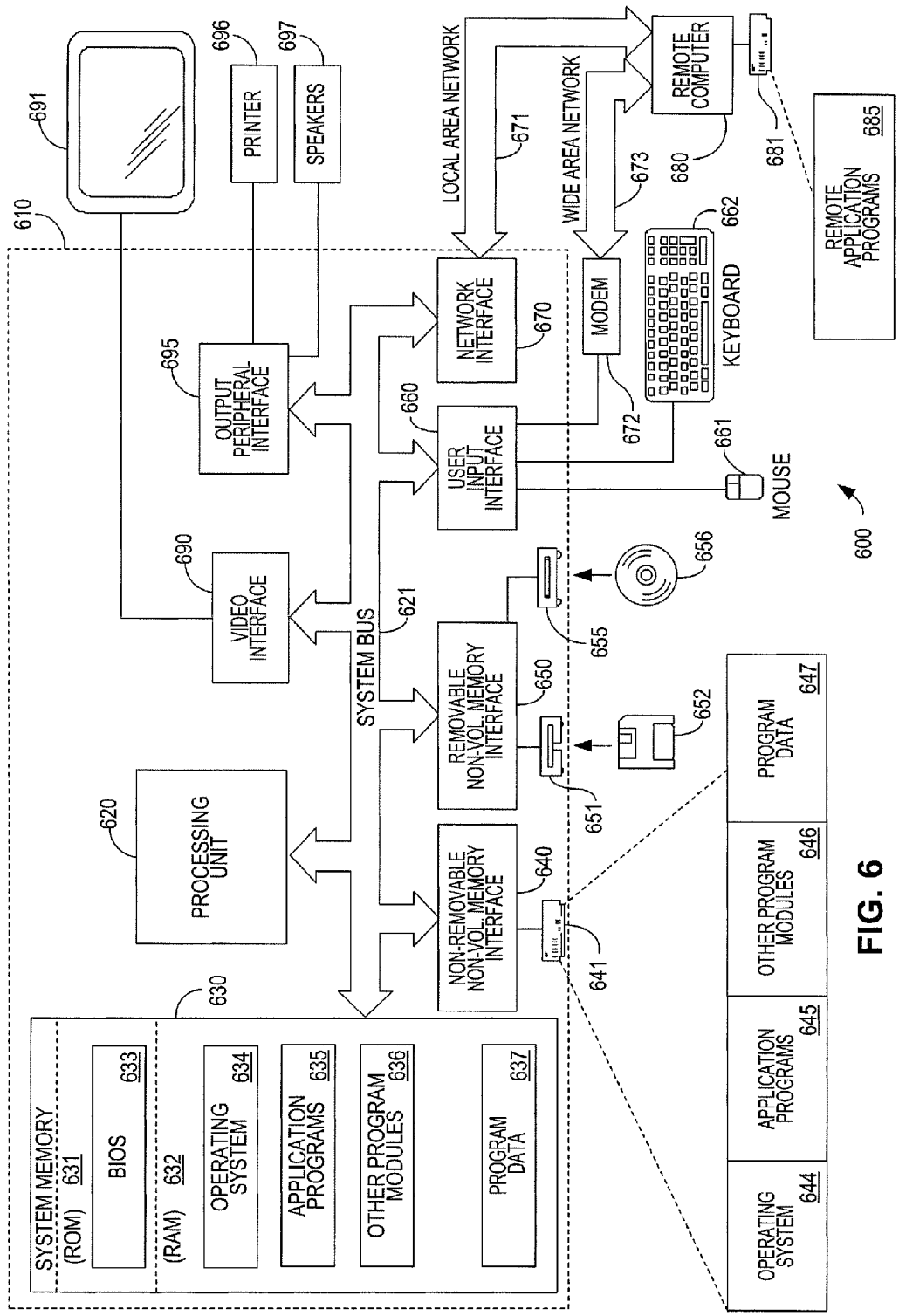
FIG. 6 is a functional block diagram of an exemplary computing device that may be used to implement some embodiments of the invention.

FIG. 6 illustrates an example of a suitable computing system environment 600 on which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device adapted for providing cloud computing services, the computing device comprising:
   a physical enclosure;
   at least one processor disposed within the enclosure, the at least one processor being adapted to execute queries on an encrypted cloud database;
   a network interface disposed within the enclosure, the network interface being adapted to provide an interface to a network and comprising security circuitry, the security circuitry comprising:
   one or more components within the enclosure adapted to:
     receive an encrypted query over the network, the encrypted query being received from a device of a subscriber to the cloud computing service and being encrypted in a first encrypted format;

translate, within the enclosure, the encrypted query to a second encrypted format for application to the encrypted cloud database, wherein the first encrypted format is different from the second encrypted format;

provide the translated query in the second encrypted format for execution by the at least one processor against the encrypted cloud database;

receive a result of the translated query after execution by the at least one processor;

encrypt the result into the first encrypted format; and transmit the encrypted result over the network directed to the device of the subscriber;

wherein the security circuitry further comprises an aggregation component within the enclosure adapted to perform an aggregation function producing an aggregate result; and the aggregated result is provided as the result of the translated query.

2. The computing device of claim 1, wherein:
the network interface comprises a network interface card connected to a bus of the computing device.

3. The computing device of claim 2, wherein the network is the Internet and the bus is a PCI bus.

4. The computing device of claim 1, wherein:
the security circuitry further comprises a hardware store configured with at least one encryption key to decrypt the query and encrypt the result.

5. The computing device of claim 1, wherein:
the cloud database comprises an encrypted database; and
the computing device comprises a query engine that executes the translated, decrypted query against the encrypted database.

6. The computing device of claim 5, wherein the encrypted database is encrypted via a different security mechanism than the encrypted query received from the device of the subscriber.

7. The computing device of claim 1 wherein:
the computing device is a first computing device;
the database is a first database;
the first computing device is coupled to a second computing device:
the second computing device comprises:
a clear text database; and
at least one processor coupled to the clear text database, the at least one processor configured to execute a clear text query on the clear text database;
the network interface comprises a query splitter component configured to generate from the decrypted query a first query portion for execution on the clear text database and a second query portion for execution on the encrypted database.

8. The computing device of claim 7, wherein:
the second computing device is configured to create the clear text database as a temporary database by decrypting at least portions of the encrypted database.

9. A method of operating a cloud database service, the method comprising:
within a hardware component that provides an interface between an unsecured network and a database service configured to provide a cloud database service:
exchanging, over a public network, with a computing device of a subscriber of the cloud database service a query and a query result, the query and query result being exchanged in a first encrypted format;
processing the query from the first encrypted format used for communication over the public network, to at least one second encrypted format, wherein the first encrypted format is different than the second encrypted format;
exchanging, within a private cloud database environment, with at least one query engine the processed query and a result of execution of the query by the query engine, in the second encrypted format; and
returning, via the public network, the query result to the computing device of the subscriber translated into the first encrypted format;
wherein the result of execution of the query is encrypted data; and
the method further comprises, within the hardware component, on the encrypted data, performing an aggregation function producing an aggregate result, wherein the aggregated result is provided as the query result to the computing device of the subscriber.

10. The method of claim 9, further comprising:
identifying from the query a portion for execution on the encrypted database and a remainder portion of the query;
executing the portion of the query on an encrypted database; and
executing the remainder on a clear text database.

11. The method of claim 10, further comprising:
generating the clear text database by decrypting at least a portion of the encrypted database.

12. The method of claim 11, further comprising:
deleting the clear text database following execution of the query.

13. A security device in an enclosure, the security device comprising:
a physical network interface that connects to a public network;
an internal bus interface;
programmable circuitry for securely storing a private key; and
control circuitry for:
receiving, via the public network, an encrypted database query over the network interface, wherein the encrypted database query is encrypted in a first encrypted format;
translating the encrypted database query from the first encrypted format used for communication over the public network, to at least one second encrypted format, wherein the first encrypted format is different than the second encrypted format, the translating comprising decrypting the encrypted database query using the private key according to the first encrypted format;
providing the translated database query over the internal bus interface;
exchanging, within a private cloud database environment, with at least one query engine, the translated encrypted database query and a result of execution of the query by the query engine, in the at least one second encrypted format, wherein the security device performs an aggregation function comprising summing values matching the query or counting a number of records matching the query, and a result of the aggregation function is provided as a query result; and
returning, via the public network, the query result to a computing device of a subscriber translated into the first encrypted format.

14. The security device of claim 13, wherein:
the programmable circuitry comprises a field programmable gate array.

15. The security device of claim 14, wherein:
the field programmable gate array comprises the control circuitry.

16. The security device of claim 13, wherein:
the private key is securely stored by storing the private key in encrypted form.

17. The security device of claim 13, wherein:
the internal bus comprises a PCI-bus.

18. The security device of claim 17, wherein:
the security device has a form factor of a network interface card for a server.

19. The computing device of claim 1 wherein:
cleartext data processed inside the device is only available inside a semiconductor device of the computing device.

* * * * *